(12) United States Patent
Sharif et al.

(10) Patent No.: US 9,197,630 B2
(45) Date of Patent: Nov. 24, 2015

(54) AUTOMATED CERTIFICATE MANAGEMENT

(75) Inventors: Tariq Sharif, Issaquah, WA (US); Colin H. Brace, Mercer Island, WA (US); Nakul Garg, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 228 days.

(21) Appl. No.: 12/719,853

(22) Filed: Mar. 8, 2010

(65) Prior Publication Data

US 2011/0219227 A1    Sep. 8, 2011

(51) Int. Cl.
*H04L 29/06* (2006.01)
*G06F 21/33* (2013.01)

(52) U.S. Cl.
CPC ............ *H04L 63/0823* (2013.01); *G06F 21/33* (2013.01); *H04L 63/102* (2013.01); *G06F 2221/2107* (2013.01); *G06F 2221/2149* (2013.01); *G06F 2221/2151* (2013.01); *H04L 63/0428* (2013.01); *H04L 63/061* (2013.01); *H04L 2463/061* (2013.01)

(58) Field of Classification Search
CPC . H04L 63/102; H04L 63/0428; H04L 63/061; H04L 63/0823; H04L 2463/061; G06F 2221/2149; G06F 21/33; G06F 2221/2107; G06F 2221/2151
USPC ................ 726/14, 6; 713/158, 156, 164, 155; 380/277
See application file for complete search history.

(56) References Cited

U.S. PATENT DOCUMENTS

| | | | |
|---|---|---|---|
| 6,233,341 B1 * | 5/2001 | Riggins ........................ | 380/277 |
| 6,684,331 B1 | 1/2004 | Srivastava | |
| 6,738,900 B1 * | 5/2004 | Hardjono et al. ............. | 713/156 |

(Continued)

FOREIGN PATENT DOCUMENTS

EP          1732263 A1    12/2006
WO    WO 2005/045644 A2 *  5/2005

OTHER PUBLICATIONS

M Numao, A Secure Key Registration System Based on Proactive Secret-Sharing Scheme, Proceedings of the Fourth International Symposium on Autonomous Decentralized Systems , 1999.*

(Continued)

*Primary Examiner* — Saleh Najjar
*Assistant Examiner* — Oleg Korsak
(74) *Attorney, Agent, or Firm* — Aneesh Mehta; Kate Drakos; Micky Minhas

(57) ABSTRACT

A certificate management system provides automated management of certificate lifecycles and certificate distribution. Rather than depend upon an administrator to manually distribute and manage certificates, the system self-generates certificates, distributes the certificates to appropriate servers or other parties, and transitions from old certificates to new certificates in a well-defined manner that avoids breaking functionality. After generating one or more certificates, the system securely shares certificates in a way that parties that use them can find the new certificates without an administrator manually distributing the certificates. When it is time to update certificates, the system generates new certificates and shares the new certificates in a similar way. During a transition period, the system provides a protocol by which both old and new certificates can be used to perform authenticated access to resources, so that the transition from an old to a new certificate does not break services.

16 Claims, 3 Drawing Sheets

(56) References Cited

U.S. PATENT DOCUMENTS

| | | | |
|---|---|---|---|
| 6,940,979 B1* | 9/2005 | Bobbitt | 380/277 |
| 7,272,714 B2* | 9/2007 | Nagaratnam et al. | 713/156 |
| 7,366,906 B2* | 4/2008 | Enokida | 713/175 |
| 7,484,089 B1 | 1/2009 | Kogen et al. | |
| 7,512,974 B2* | 3/2009 | Callaghan et al. | 726/14 |
| 7,584,351 B2* | 9/2009 | Kakii | 713/157 |
| 7,937,583 B2* | 5/2011 | Thornton et al. | 713/156 |
| 8,028,167 B2* | 9/2011 | Andersson et al. | 713/175 |
| 8,116,456 B2* | 2/2012 | Thomas | 380/277 |
| 2004/0171369 A1 | 9/2004 | Little et al. | |
| 2004/0243805 A1 | 12/2004 | Enokida | |
| 2006/0015716 A1 | 1/2006 | Thornton et al. | |
| 2006/0047951 A1 | 3/2006 | Reilly et al. | |

OTHER PUBLICATIONS

Jing Zhang, "Flexible Certificate Management for Secure HTTPS Client/Server Communication", Final Thesis, Sep. 22, 2005.*

Cser, et al., "The Forrester Wave: Identity and Access Management, Q4 2009", Retrieved at <<http://ca.com/Files/IndustryAnalystReports/iamforresterq4_2009_221389.pdf>>, Nov. 3, 2009, pp. 17.

"Oracle Application Server 10g New Features Overview", Retrieved at <<http://www.oracle.com/technology/products/ias/pdf/10g_904_nf_wp.pdf>>, A Technical White Paper, Dec. 2003, pp. 1-43.

"OASIS Members Form Key Management Interoperability Protocol (KMIP) Committee", Retrieved at <<http://xml.coverpages.org/ni2009-02-27-a.html>>, Oct. 27, 2009, pp. 59.

Rudich, Joe, "PKI: A Primer", Retrieved at <<http://www.ibm.com/developerworks/web/library/s-pki.html>>, Dec. 1, 2000, pp. 4.

"SSL for the Enterprise: GeoRoot", Retrieved at <<http://www.geotrust.com/enterprise-ssl-certificates/georoot/>>, Nov. 23, 2009, pp. 2.

"Comodo Certificate Manager for PKI Administration", Retrieved at <<http://enterprise.comodo.com/resources/white-papers/digital-certificates/security-trust-compliance-2008-10.pdf>>, vol. 3., Nov. 23, 2009, pp. 7.

W.E. Burr, "Public Key Infrastructure (PKI) Technical Specifications: Part A—Technical Concept of Operations", Working Draft, TWG-98-59, Sep. 4, 1998, pp. 53.

"European Search Report", Mailed Date: Jul. 18, 2013, Application No. 11753846.2-1856, Filed Date: Sep. 5, 2012, pp. 11.

Steele, Matt., "ADFS 2.0 RC is Here!", Retrieved at <<http://channel9.msdn.com/shows/Identity/ADFS-20-RC-is-Here/>>, Dec. 18, 2009, p. 1.

Zhu, Robert., "Configuring Active Directory Federation Services 2.0", Retrieved at <<http://blogs.msdn.com/b/card/archive/2010/01/16/configuring-active-directory-federation-services-2-0.aspx>>, Jan. 15, 2010, pp. 6.

"MSDN blogs. Identity and Access Team, Announcing the AD FS 2.0 Release Candidate and More", Retrieved at <<http://blogs.msdn.com/b/card/archive/2009/12/18/announcing-the-ad-fs-2-0-release-candidate-and-more.aspx>>, Dec. 18, 2009, p. 1.

"Office Action Received in European Patent Application No. 11753846.2", Mailed Date: Oct. 22, 2013, Filed Date: Mar. 4, 2011, 5 Pages.

"Office Action Received in European Patent Application No. 11753846.2", Mailed Date: Apr. 17, 2014, Filed Date: Mar. 4, 2011, 7 Pages.

"Office Action Issued in Chinese Patent Application No. 201180012917.8", Mailed Date: Jul. 3, 2014, 14 pages.

"ADFS 2.0 Rc is Here!", Matt Steele, http://channel9.msdn.com/Shows/Identity/Adfs-20-Rc-is-Here, 7th minute to 20th minute, Dec. 18, 2009.

"Second Office Action Issued in Chinese Patent Application No. 201180012917.8", Mailed Date: Feb. 2, 2015, 10 pages.

* cited by examiner

AUTOMATED CERTIFICATE MANAGEMENT

BACKGROUND

Many organizations and systems include server computer systems that provide various important functions to the organization. For example, even a small business may have an email server, one or more database servers, a company intranet portal hosted by a web server, a file server, and so forth. These functions may reside on a single computer system or on several computer systems, such as to increase scalability and provide adequate resources for each function based on anticipated or measured loads. Products, such as MICROSOFT™ WINDOWS™ Small Business Server provide multiple server functions in a single product.

When an organization has multiple servers, the servers may include various authentication mechanisms and security protocols to allow servers to trust one another and to allow users to sign on to access the functions provided by each server. One security system for allowing servers to communicate using a single sign-on is MICROSOFT™ ACTIVE DIRECTORY™ Federation Services (ADFS). ADFS was introduced in MICROSOFT™ WINDOWS SERVER™ 2003 for organizations to participate in standards-based identity federation. ADFS provides claims-based authentication across servers and even across organizations. Claims based authentication uses tokens and certificates to authenticate a user or server with a set of claims contained within the token.

Unfortunately, introducing certificates also introduces the problem of certificate management, as certificates expire over time. In a product deployment that uses Public Key Infrastructure (PKI) or similar policies to perform some of its functions, it is very common to assume that the product relies on an administrator to manually manage the certificate lifecycle. In addition, such products rely on the administrator to do the heavy lifting of sharing these certificates in a server farm. For many organizations, particularly small businesses, where sophisticated administrators are typically not employed, this assumption often leads to loss of functionality and servers that cannot communicate correctly to provide the expected functions to the organization. Even when an administrator does replace an old certificate with a new one as scheduled, there is a chance that something in a system might break because of this sudden change, by not giving a warning to others dependent on the system about this change ahead of time. In addition, certificate updates involve significant planning as certificates are typically updated manually on each server on the same day as part of scheduled downtime.

SUMMARY

A certificate management system is described herein that provides automated management of certificate lifecycles and certificate distribution. Rather than depend upon an administrator or other user to manually distribute and manage certificates, the certificate management system self-generates certificates, distributes the certificates to appropriate servers or other parties, and transitions from old certificates to new certificates in a well-defined manner that avoids breaking functionality. After generating one or more certificates, the system securely shares certificates in a way that parties that use them can find the new certificates without an administrator manually distributing the certificates. When it is time to update certificates, the system generates new certificates and shares the new certificates in a similar way. During a transition period, the system provides a protocol by which both old and new certificates can be used to perform authenticated access to resources, so that the transition from an old to a new certificate does not break services. Sometime later, the system removes the old certificates and the cycle repeats as the new certificates approach expiration. During each of these phases, no administrative intervention is expected or required. Thus, the certificate management system greatly simplifies the process of establishing trust between the various servers of an organization and relieves users from diagnosing complex problems that commonly occur under manual management of certificate lifetimes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
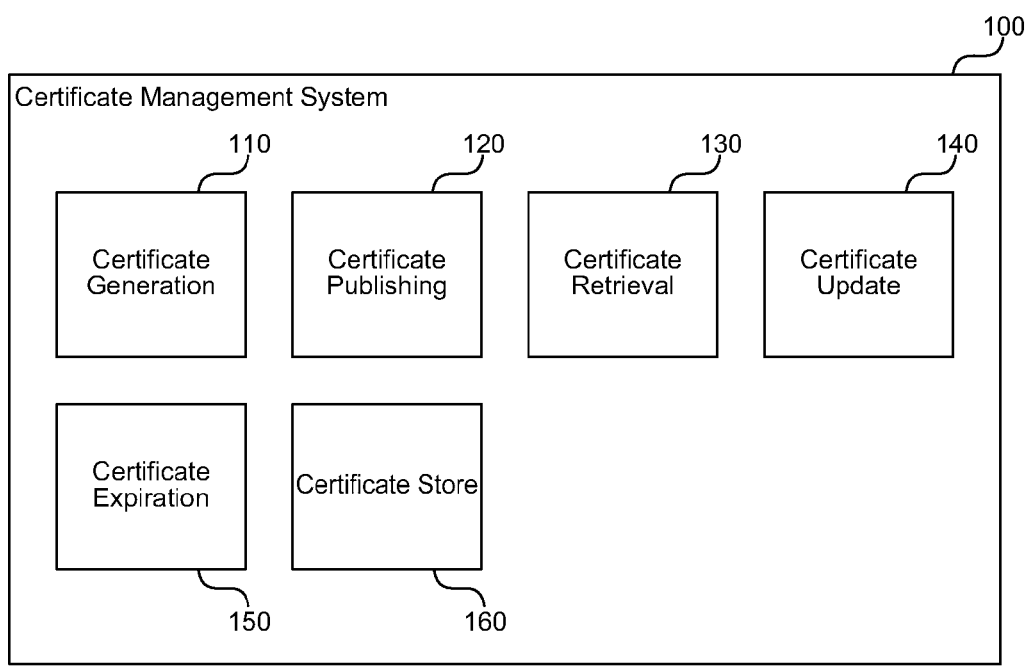
FIG. 1 is a block diagram that illustrates components of the certificate management system, in one embodiment.

A certificate management system is described herein that provides automated management of certificate lifecycles and certificate distribution. Rather than depend upon an administrator or other user to manually distribute and manage certificates, the certificate management system self-generates certificates, distributes the certificates to appropriate servers or other parties, and transitions from old certificates to new certificates in a well-defined manner that avoids breaking functionality. After generating one or more certificates, the system securely shares certificates in a way that parties that use them can find the new certificates without an administrator manually distributing the certificates. For example, a certificate server in a small business may provide certificates to other servers (e.g., an email server) without manual intervention. When it is time to update certificates, the system generates new certificates and shares the new certificates in a similar way. For example, some time prior to certificate expiration, the system may create replacement certificates for soon-to-expire certificates. During a transition period, the system provides a protocol by which both old and new certificates can be used to perform authenticated access to resources, so that the transition from an old to a new certificate does not break services. Sometime later, the system removes the old certificates and the cycle repeats as the new certificates approach expiration. During each of these phases, no administrative intervention is expected or required. Thus, the certificate management system greatly simplifies the process of establishing trust between the various servers of an organization and relieves users from diagnosing complex problems that commonly occur under manual management of certificate lifetimes.

In some embodiments, upon first configuring a new server farm using the certificate management system, the system creates its own self-signed/issued certificates for token signing and encryption. The system publishes these certificates to other security token services or applications as federation metadata using a standard protocol. If the system is configured for farm configuration, the system encrypts these certificates with a symmetric key and shares the encrypted certificates with other certificate management machines in the farm. The symmetric key (or a key derivation key from which others servers can derive the symmetric key) is also saved and made accessible to other machines in the farm using a secure method. After the system creates certificates, the system starts monitoring the certificates regularly (e.g., daily) to determine whether the certificates are about to expire. A predetermined time before the expiration of the certificates (e.g., a couple of weeks), the system creates new certificates and starts to publish the new certificates as secondary certificates (e.g., using the standard called federation metadata). Publishing these certificates as secondary certificates ensures that no security token service or application is broken with a quick expiration of old certificates and gives other parties enough time to make appropriate changes on their side. After creating the new certificates, the certificate management system automatically shares the new certificates with other machines in the farm using the symmetric key and does not rely on an administrator to share certificates. Once the originally created certificates expire, the system deletes them. At a configurable time after creating new certificates and before the old certificates expire, the system promotes the new certificates to primary certificates. The time between generating/publishing new certificates and promoting the new certificates to primary defines the transition period. The system then repeats the process by monitoring the new certificates and managing their life cycle.

FIG. 1 is a block diagram that illustrates components of the certificate management system, in one embodiment. The system 100 includes a certificate generation component 110, a certificate publishing component 120, a certificate retrieval component 130, a certificate update component 140, a certificate expiration component 150, and a certificate store 160. Each of these components is described in further detail herein.

The certificate generation component 110 generates one or more certificates for token signing and encryption. The component 110 creates an initial set of certificates upon installation of the system 100 and configuration of a server farm for automated certificate management. Later, as the initial set of certificates is close to expiration, the certificate generation component 110 creates new certificates to replace the old ones. The component 110 repeats this process over time to maintain a current set of certificates that is available to perform encryption and signing services needed by application servers.

The certificate publishing component 120 publishes new certificates created by the certificate generation component 110 to make the certificates available to other servers with which the system 100 communicates. The certificate publishing component 120 may use standard protocols such as federation metadata and WS-Trust to make new certificates available upon request to other servers. A primary server may exchange a symmetric key in a secure manner with other servers and encrypt certificates using the symmetric key. In this way, certificates can be shared in the open (e.g., via a file share) but can only be accessed and used by those with an appropriate level of access (as demonstrated by possession of the symmetric key). When publishing to members of the same farm, the component 120 publishes the certificate in an encrypted manner and the content includes the public as well as the private key of the certificate. In some embodiments, this publishing is done via a web service internal to the farm (e.g., using WINDOWS™ Communication Foundation (WCF). When publishing to external trust partners of the ADFS farm, the component 120 may just publish the public key of the certificates and this publishing is done using externally visible federation metadata. In some embodiments, the component 120 may include separate subcomponents for publishing to external parties and for publishing to internal farm members.

The certificate publishing component 120 may publish both primary and secondary certificates. For example, the initially created set of certificates are primary certificates, but later replacement certificates may initially be published as secondary certificates for some period of time to allow a smooth transition between old and new certificates. After the transition period, the certificate publishing component 120 publishes the replacement certificates as primary certificates.

The certificate retrieval component 130 operates on a server that depends on the certificate management system 100 to retrieve new certificates shared by the certificate publishing component 120. Application servers or other servers may periodically poll a primary server of the system to determine whether new certificates are available for download to the application server's certificate store.

The certificate update component 140 operates on a server that depends on the certificate management system 100 to add primary certificates retrieved from the system 100 through the certificate publishing component 120 to a certificate store local to a server in the server farm. The certificate update component 140 also retrieves secondary certificates and places the secondary certificates into a certificate store in a manner that accesses can be made by clients using either the primary or secondary certificates during a transition period. Thus, even if a particular server has failed to update to a set of replacement certificates, clients can still communicate with the particular server using one of the primary or secondary certificates. By the time the system 100 promotes the secondary certificates to primary certificates (e.g., at the close of the transition period), all servers will have had sufficient time to update to the latest set of certificates.

The certificate expiration component 150 removes expired certificates from the system 100 and promotes secondary replacement certificates to primary certificates. Once a certificate is beyond its lifetime, servers will no longer be using the certificate for encryption and signing, so the component 150 deletes certificates that have expired. By this time, the system 100 has distributed a set of secondary certificates as replacements as described herein, and the component 150 promotes the secondary certificates to primary certificates.

The certificate store 160 stores certificates for ADFS generated by the certificate generation component 110. The certificate store 160 may include primary certificates and secondary certificates. In addition, individual application servers may include their own certificate store 160 for storing downloaded primary and secondary certificates for encrypting and signing data. There may be a separate cryptographic store provided by a cryptographic service provider (CSP) that is not shown.

Although the above components are described above in the context of a single certificate management system 100, those of ordinary skill in the art will recognize that the components can be distributed on various servers and computer systems to carry out the functions described herein. For example, each server in an organization may include its own certificate expiration component 150 that removes old and promotes new certificates for that server. Alternatively or additionally, a primary certificate server may remove old certificates on one or more servers in a centrally managed manner. The system is not limited to any particular distribution of components and is compatible with various distributions that fulfill the purposes and functions described herein.

The computing device on which the certificate management system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
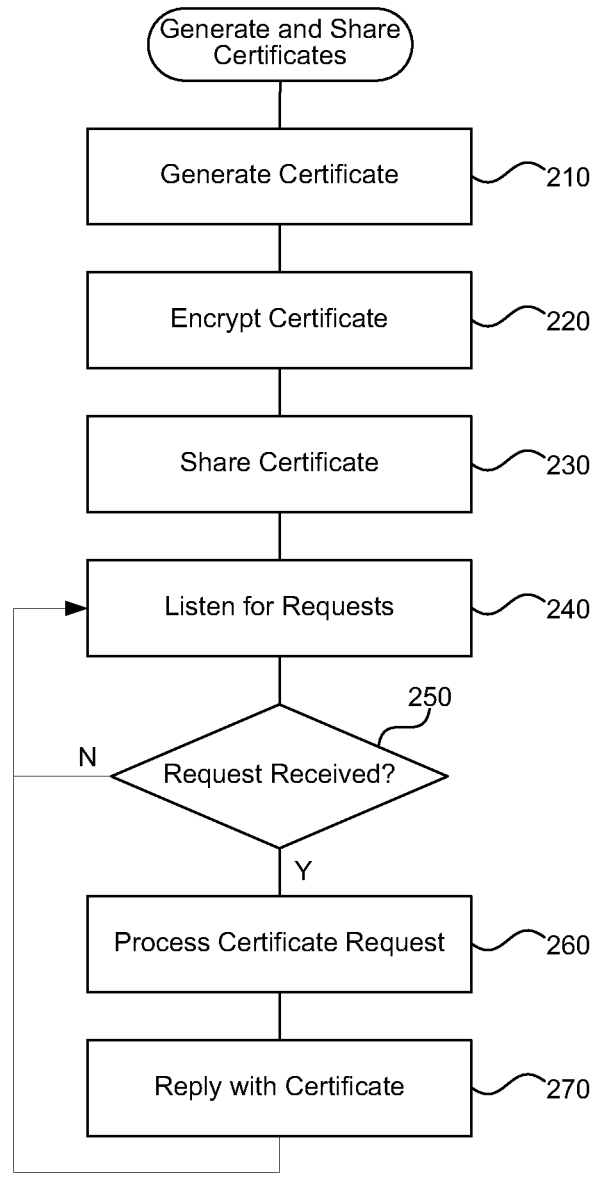
FIG. 2 is a flow diagram that illustrates processing of the system to generate and share certificates, in one embodiment.

FIG. 2 is a flow diagram that illustrates processing of the system to generate and share certificates, in one embodiment. Beginning in block 210, the system generates one or more certificates for token signing and encryption. The certificates are self-signed/self-issued. The system may create certificates of a variety of purposes. For example, the system may create a general certificate used by servers in a server farm to establish trust with one another, a certificate for a remote server to use to communicate with the server farm, and so forth. Continuing in block 220, the system encrypts the certificates using a key securely shared among servers in a server farm. For example, the system may generate and use a symmetric key to encrypt the one or more generated certificates. Encrypting the certificates allows the certificates to be shared more freely without worrying that unauthorized parties can access the certificates.

Continuing in block 230, the system publishes the certificates at a location available to each server in the server farm. For example, the system may share the certificates at a file share or via a common protocol at a port of a certificate server. The system may also indicate a purpose for each certificate and whether the certificate is a primary or secondary certificate. Sometime later, one or more servers request published certificates as described by the following steps. Continuing in block 240, the system listens for requests to access published certificates. For example, the system may listen at a well-known port for server requests to access certificates associated with the server farm. Continuing in decision block 250, if the system receives a request to access a certificate, then the system continues at block 260, else the system loops to block 240 to continue listening for requests.

Continuing in block 260, the system processes the received request to access a certificate. For example, a server in a server farm may periodically poll the certificate server for new certificates. Continuing in block 270, the system replies with the requested certificate. In some embodiments, servers may request multiple certificates or certificates newer than a specified date/time from the certificate server, and the system replies with one or more certificates that meet the specified criteria. After block 270, the system loops to block 240 to listen for additional certificate access requests.

Figure 3:
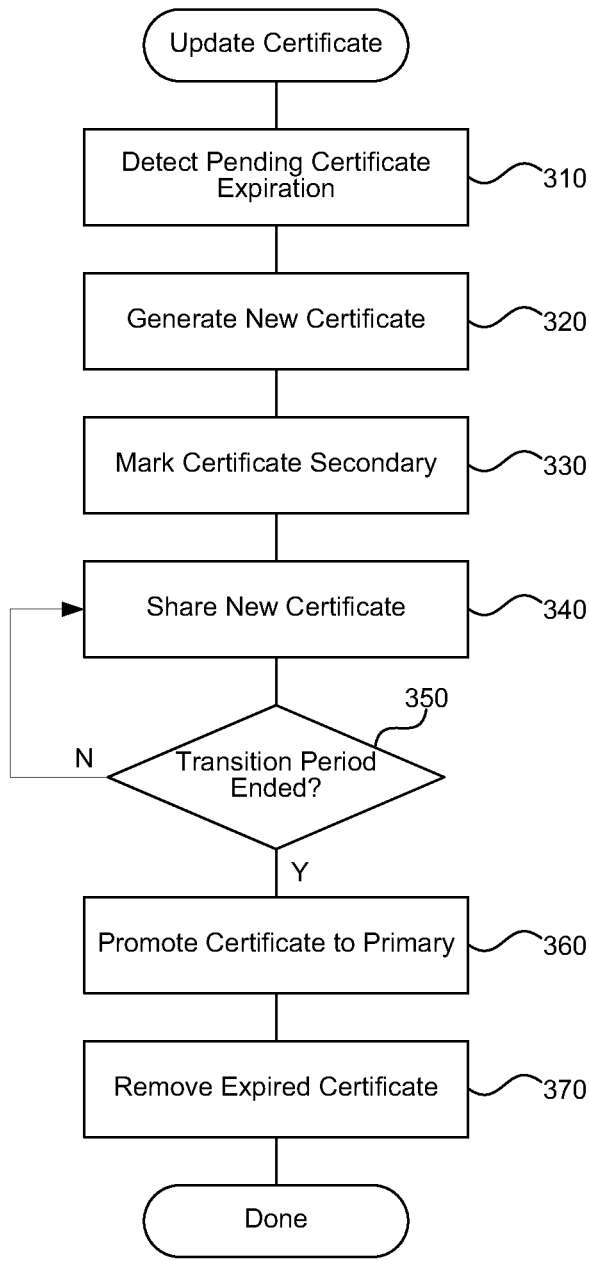
FIG. 3 is a flow diagram that illustrates processing of the system to update one or more certificates, in one embodiment.

FIG. 3 is a flow diagram that illustrates processing of the system to update one or more certificates, in one embodiment. Beginning in block 310, the system detects pending expiration of a certificate. For example, the system may periodically poll certificates stored in a certificate store to identify certificates close to expiration (e.g., within a week or two of expiration). The system may receive a configurable parameter that specifies a duration before expiration to start updating certificates. The system may handle the expiration of many certificates at the same time although a single certificate is described in this example. Continuing in block 320, the system generates a new certificate to replace the expiring certificate. For example, the system may invoke an operating system application programming interface (API) or other component for generating certificates.

Continuing in block 330, the system identifies the new certificate as a secondary certificate, so that servers retrieving the certificate will continue to use existing certificates as well as accepting requests that use the new certificate. Continuing in block 340, the system publishes the new certificate at a location available to each server in a server farm. Servers will pick up the new certificate automatically and begin allowing accesses that rely on the new certificate. Publishing the new certificate may also include publishing the certificate to external partners outside of the ADS farm. Continuing in block 350, the system detects whether a transition period has ended, and if so continues at block 360, else the system loops to block 350 to wait for the end of the transition period. The transition period ends when the certificate expires or sometime after certificate expiration (it may be useful to allow a certificate to stay valid until slightly after expiration).

Continuing in block 360, the system promotes the new certificate from a secondary certificate to a primary certificate. This completes the replacement of the expiring certificate with the new certificate. The system may simply mark the certificate differently in the certificate store so that dependent servers notice the change and update their own certificate stores to indicate the new primary certificate. Continuing in block 370, the system removes the expired certificate from the certificate store. This may also prompt dependent servers to remove the expired certificate if they have not already removed it according to their own expiration management schedules. The transition period provided ensures that no security token service or application is broken with a quick expiration of old certificates and gives other parties enough time to make appropriate changes on their side. After block 370, these steps conclude.

In some embodiments, the certificate management system provides each server in a server farm with a common service account through which each server can access shared certificates. For example, by sharing certificates in a store that is marked as accessible by the service account, any other server that holds the credentials of the service account can access the store and any data within the store. This provides an easy way of sharing data among multiple machines in a secure manner that is already provided by existing server user access management.

In some embodiments, the certificate management system provides configurable parameters that an administrator can adjust to increase security or to increase the likelihood of a successful transition between certificates. For example, some administrators may want a shorter transition period for added security, while others may prefer a longer transition period for added compatibility. The system allows an administrator to configure the transition period to facilitate tuning the system to accommodate such differing goals.

In some embodiments, the certificate management system publishes metadata that indicates information such as which certificates are in use, which are expired, which are primary, which are secondary, and so forth. In this way, servers in a server farm can periodically check the published metadata to determine if it is time for further action, such as updating or promoting certificates.

In some embodiments, the certificate management system retrieves certificates from a separate certificate authority (CA). Although described herein as generating its own certificates, the system can also defer to a particular CA trusted by accessing servers to generate certificates shared and managed by the system. For example, the system may invoke the WINDOWS SERVER™ 2008 R2 web services API to get certificates from a public CA.

From the foregoing, it will be appreciated that specific embodiments of the certificate management system have been described herein for purposes of illustration, but that various modifications may be made without deviating from the spirit and scope of the invention. Accordingly, the invention is not limited except as by the appended claims.

We claim:

1. At a computer system, the computer system including a processor, system memory, and a certificate store, a method for managing the lifecycle of a plurality of certificates any of which can be used for authenticated access to a resource in a server farm, the method comprising:
   detecting pending expiration of a certificate that can be used for authenticated access to the resource, the expiring certificate identified as a primary certificate used for authenticated access to the resource, the expiring certificate previously promoted from a secondary certificate used for authenticated access to the resource to the primary certificate in response to detecting pending expiration of a prior primary certificate, the expiring certificate and the prior primary certificate both usable for authenticated access to resource up until the prior primary certificate expired;
   in response to detecting pending expiration of the expiring certificate, generating a new certificate in anticipation of eventually transitioning the new certificate to the primary certificate to replace the expiring certificate and that can be used for authenticated access to the resource along with the expiring certificate up until the expiring certificate expires;
   publishing the new certificate as a secondary certificate used for authenticated access to the resource such that servers can authenticate access to the resource using either the expiring certificate or the new certificate, the new certificate published as a secondary certificate to the certificate store;
   accessing a configurable certificate transition period, the configurable certificate transition period indicating a period of time that both an expiring certificate and a new certificate are simultaneously valid for authenticated access to the resource prior to the expiring certificate being removed, the configurable certificate transition period selected by an administrator through the use of configurable parameters to tune the configurable transition period to a selected balance between security of the resource and certificate compatibility for accessing the resource;
   maintaining both the expiring certificate and the new certificate in the certificate store as valid for authenticated access to the resource during the configurable certificate transition period so as to give other parties time to adopt the new certificate;
   after detecting that the configurable certificate transition period has ended:
      republishing the new certificate as a primary certificate to promote the new certificate from a secondary certificate to a primary certificate, the new certificate republished as a primary certificate to the certificate store;
      removing the expiring certificate from the certificate store to prompt any dependent servers to also remove the expiring certificate; and
      generating a further new certificate that is to replace the new certificate when the new certificate expires.

2. The method of claim 1 wherein generating a new certificate that is to replace the expiring certificate comprises invoking a local application programming interface (API) for creating certificates.

3. The method of claim 1 wherein generating a new certificate that is to replace the expiring certificate comprises invoking a remote public certificate authority (CA) to generate certificates.

4. The method of claim 1 wherein publishing the new certificate as a secondary certificate to the certificate store comprises placing the new certificate in a public location in the server farm secured using a common service account so that only authorized parties can access the new certificate.

5. The method of claim 1 wherein detecting that the configurable certificate transition period has ended comprises detecting expiration of the expiring certificate.

6. A computer system for automatically managing the lifecycle of a plurality of certificates any of which can be used for access to a resource, the system comprising:
   a processor and memory configured to execute software instructions;
   a certificate store configured to store certificates;
   a component configured to detect pending expiration of a certificate that can be used for authenticated access to the resource, the expiring certificate identified as a primary certificate used for authenticated access to the resource, the expiring certificate and a prior primary certificate both usable for authenticated access to the resource up until the prior primary certificate expired;
   a certificate generation component configured to generate a new certificate in response to detected pending expiration of the primary certificate and in anticipation of eventually transitioning to the new certificate to the primary certificate to replace the expiring certificate, the new certificate useable for authenticated access to the resource along with the expiring certificate up until the expiring certificate expires;
   a certificate publishing component configured to publish the new certificate as a secondary certificate used for authenticated access to the resource such that servers can authenticate access to the resource using either the expiring certificate or the new certificate, the new certificate published as a secondary certificate to the certificate store;
   a certificate retrieval component configured to retrieve new certificates published by the certificate publishing component;
   a certificate update component configured to:
      access a configurable certificate transition period, the configurable certificate transition period indicating a period of time that the expiring certificate and the new certificate are simultaneously valid for authenticating access to the resource prior to the expiring certificate being removed, the configurable certificate transition period selected by an administrator through the use of configurable parameters to tune the configurable certificate transition period to a selected balance between security of the resource and certificate compatibility for accessing the resource; and maintain both the expiring certificate and the new certificate in the certificate store as valid for authenticated access to the resource during the configurable certificate transition period so as to give other parties time to adopt the new certificate;

a certificate expiration component configured to remove the expiring certificate from the system after detecting that the configurable certificate transition period has ended, removing the expiring certificate prompting any dependent servers to also remove the expired certificate;

wherein the certificate publishing component is further configured to republish the new certificate as a primary certificate to promote the new certificate from a secondary certificate to a primary certificate after detecting that the configurable certificate transition period has ended, the new certificate published as a primary certificate to the certificate store; and wherein the certificate generation component is further configured to generate a further new certificate that is to replace the new certificate when the new certificate expires.

7. The system of claim 6 wherein the certificate generation component is further configured to create an initial set of certificates upon installation of the system and configuration of a server farm for automated certificate management.

8. The system of claim 6 wherein the certificate generation component is further configured to create new certificates to replace old ones nearing expiration without intervention by an administrator.

9. The system of claim 6 wherein the certificate publishing component is further configured to use a standard protocol to make new certificates available upon request to other servers.

10. The system of claim 6 wherein the certificate publishing component is further configured to encrypt certificates using a key shared securely with servers in the server farm.

11. The system of claim 6 wherein the certificate publishing component is further configured to publish both primary and secondary certificates to allow a transition period between original and replacement certificates as certificates approach expiration.

12. A computer program product for use at a computer system, the computer system including a certificate store, the computer program product comprising a computer storage device having stored thereon instructions for controlling the computer system to manage the lifecycle of a plurality of certificates any of which can be used for authenticated access to a resource in a server farm, wherein the instructions, when executed, cause a processor to perform actions comprising:

detecting pending expiration of a certificate that can be used for authenticated access to the resource, the expiring certificate identified as a primary certificate used for authenticated access to the resource, the expiring certificate previously promoted from a secondary certificate used to perform authenticated access to the resource within the server farm to the primary certificate in response to detecting pending expiration of a prior primary certificate, the expiring certificate and the prior primary certificate both usable for authenticated access to resource up until the prior primary certificate expired;

in response to detecting pending expiration of the expiring certificate, generating a new certificate in anticipation of eventually transitioning the new certificate to the primary certificate to replace the expiring certificate and that can be used for authenticated access to the resource along with the expiring certificate up until the expiring certificate expires;

publishing the new certificate as a secondary certificate used for authenticated access to the resource such that servers can authenticate access to the resource using either the expiring certificate or the new certificate, the new certificate published as a secondary certificate to the certificate store;

access a configurable certificate transition period, the configurable certificate transition period indicating a period of time that both an expiring certificate and a new certificate are simultaneously valid for authenticated access to the resource prior to the expiring certificate being removed, the configurable certificate transition period selected by an administrator through the use of configurable parameters to tune the configurable transition period to a selected balance between security of the resource and certificate compatibility for accessing the resource;

maintaining both the expiring certificate and the new certificate together in the certificate store as valid for authenticated access to the resource during the configurable certificate transition period so as to give other parties time to adopt the new certificate;

after detecting that the configurable certificate transition period has ended:
republishing the new certificate as a primary certificate to promote the new certificate from a secondary certificate to a primary certificate, the new certificate published as a primary certificate to the certificate store;
removing the expiring certificate from the certificate store to prompt any dependent servers to also remove the expiring certificate; and
generating a further new certificate that is to replace the new certificate when the new certificate expires.

13. The computer program product of claim 12 wherein detecting that the configurable certificate transition period has ended comprises detecting expiration of the expiring certificate.

14. The computer program product of claim 12 wherein generating a new certificate that is to replace the expiring certificate comprises invoking a local application programming interface (API) for creating certificates.

15. The computer program product of claim 12 wherein generating a new certificate that is to replace the expiring certificate comprises invoking a remote public certificate authority (CA) to generate certificates.

16. The computer program product of claim 12 wherein publishing the new certificate as a secondary certificate to the certificate store comprises placing the new certificate in a public location in the server farm secured using a common service account so that only authorized parties can access the new certificate.

* * * * *